(12) United States Patent
Nagai (10) Patent No.: US 7,545,172 B2
(45) Date of Patent: Jun. 9, 2009

(54) VOLTAGE CONVERTER APPARATUS

(75) Inventor: Hajime Nagai, Kobe (JP)

(73) Assignee: TPO Hong Kong Holding Limited, Shatin, Hong Kong (CN)

( * ) Notice: Subject to any disclaimer, the term of this patent is extended or adjusted under 35 U.S.C. 154(b) by 0 days.

(21) Appl. No.: 10/566,221

(22) PCT Filed: Jul. 28, 2004

(86) PCT No.: PCT/JP2004/010725

§ 371 (c)(1),
(2), (4) Date: Sep. 20, 2006

(87) PCT Pub. No.: WO2005/010629

PCT Pub. Date: Feb. 3, 2005

(65) Prior Publication Data

US 2007/0052297 A1    Mar. 8, 2007

(30) Foreign Application Priority Data

Jul. 28, 2003  (WO) ................. PCT/IB03/03338

(51) Int. Cl.
*H03K 19/0175* (2006.01)
(52) U.S. Cl. .......................... 326/68; 326/63
(58) Field of Classification Search ............ 326/68, 326/62, 80, 82, 83, 113, 114; 327/333
See application file for complete search history.

(56) References Cited

U.S. PATENT DOCUMENTS 4,077,031 A * 2/1978 Kitagawa et al. ............ 365/205
4,161,663 A * 7/1979 Martinez .................... 326/68

(Continued)

FOREIGN PATENT DOCUMENTS

CN    1362743    8/2002

(Continued)

OTHER PUBLICATIONS

Supplementary European Search Report for Counterpart EP Patent Application No. EP04770988.

*Primary Examiner*—Rexford Barnie
*Assistant Examiner*—Thienvu V Tran
(74) *Attorney, Agent, or Firm*—Liu & Liu (57) ABSTRACT

A voltage converting device (1) receiving a input signal (Si1) having a high input voltage (Vi_high) and a low input voltage (Vi_low), converting a voltage level of the input signal (Si1), and outputting the input signal (Si1) as a output signal (So1), wherein the voltage converting device (1) comprises a first input portion (In1) for receiving the input signal (Si1), a first output portion (Out1) for outputting the first output signal (So1), and a voltage converting means for converting at least one of the first high input voltage and the first low input voltage, the voltage converting means having a TFT (2) for switching among at least two states containing a connection state in which the first input portion (In1) is connected to a first node (N1) and a disconnection state in which the first input portion (In1) is disconnected from the first node (N1), and wherein the voltage converting means comprises a first voltage dropping means for dropping a voltage on the first node (N1) before changing from a state in which the first input portion (In1) is disconnected from the first node (N1) to a state in which the first input portion (In1) is connected to the first node (N1).

17 Claims, 4 Drawing Sheets

U.S. PATENT DOCUMENTS

| | | | |
|---|---|---|---|
| 4,916,389 A | | 4/1990 | Hori et al. |
| 5,192,879 A | * | 3/1993 | Aoki et al. .................... 326/87 |
| 5,471,149 A | * | 11/1995 | Usuki .......................... 326/68 |
| 6,975,155 B2 | * | 12/2005 | Lee ............................. 327/333 |
| 2001/0024373 A1 | | 9/2001 | Cuk |
| 2002/0031032 A1 | | 3/2002 | Ooishi |
| 2003/0042437 A1 | | 3/2003 | Worley et al. |
| 2003/0080780 A1 | | 5/2003 | Okamoto et al. |

FOREIGN PATENT DOCUMENTS

| | | |
|---|---|---|
| EP | 0449567 | 10/1991 |
| EP | 1220450 | 7/2002 |
| JP | 2000091898 | 3/2000 |

\* cited by examiner

VOLTAGE CONVERTER APPARATUS

FIELD OF THE INVENTION

The present invention relates to a device for supplying an input signal received at its input portion to a node between the input portion and an output portion via a switching means.

DESCRIPTION OF RELATED ART

In a case of a display device such as a mobile phone, TFTs each of which is provided in a pixel within a display region are usually driven using a different voltage level from a voltage level used for driving an IC provided outside the display region. For this reason, the display device comprises a voltage converting device for converting a voltage level.

Figure 1:
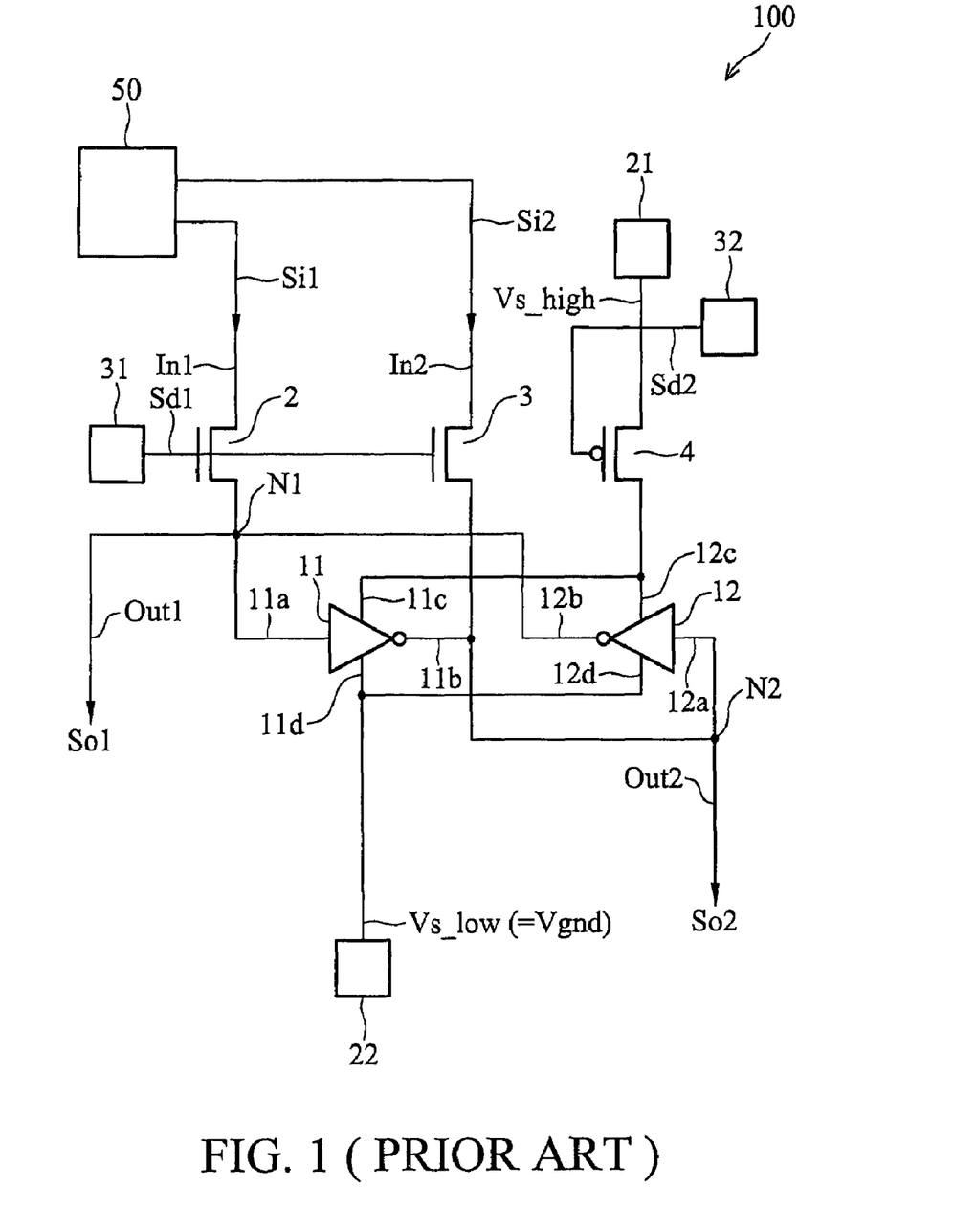
FIG. 1 is a schematic diagram showing a conventional voltage converting device.
Figure 2:
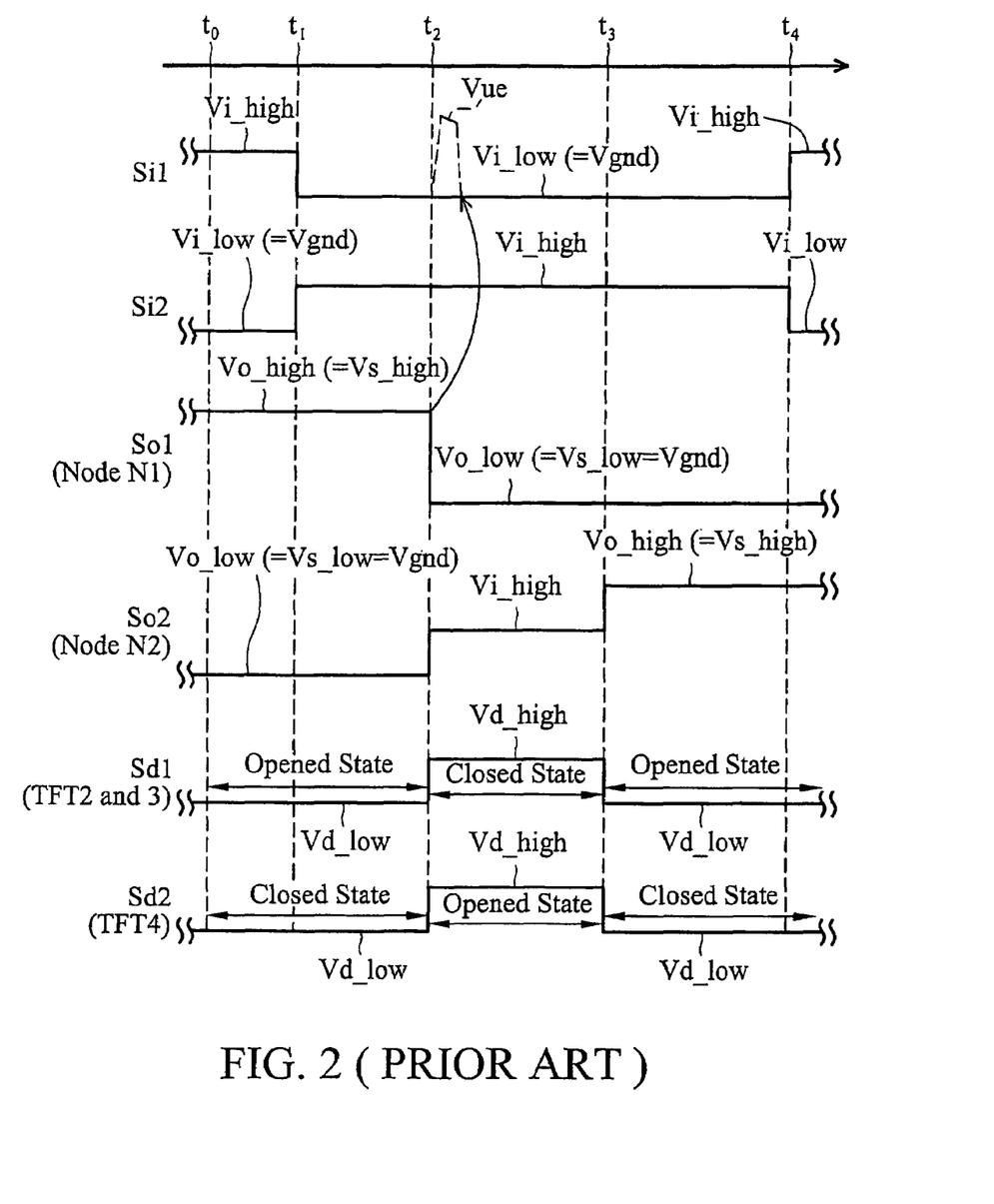
FIG. 2 shows a timing chart about the conventional voltage converting device shown in FIG. 1.

FIG. 1 is a schematic diagram showing a conventional voltage converting device. FIG. 2 shows a timing chart about the conventional voltage converting device shown in FIG. 1.

The voltage converting device 100 receives input signals Si1 and Si2 from a signal source 50, and each of the input signals Si1 and Si2 has alternately repeated low input voltage Vi_low and high input voltage Vi_high (see FIG. 2). The voltage converting device 100 comprises a high voltage power supply 21 and a low voltage power supply 22 in order to convert voltage levels of input signals Si1 and Si2, the high voltage power supply 21 generates a high power supply voltage Vs_high which is higher than the high input voltage Vi_high, and the low voltage power supply 22 generates a low power supply voltage Vs_low which is the same as the low input voltage Vi_low. The voltage converting device 100 comprising such high voltage power supply 21 and low voltage power supply 22 converts the low input voltages Vi_low of the input signals Sit and Si2 into a low output voltage Vo_low using the low voltage power supply 22 and converts the high input voltages Vi_high of the input signals Si1 and Si2 into a high output voltage Vo_high using the high voltage power supply 21.

It is briefly described below how the voltage converting device 100 converts the voltage levels of the input signals Si1 and Si2 inputted into the input portions In1 and In2.

Assuming that the input signals Si1 and Si2 are the low input voltage Vi_low and the high input voltage Vi_high, respectively, during a period from an instant t1 to an instant t4. Further, assuming that, during a period from the instant t1 to an instant t2, the TFTs 2 and 3 are opened state and the TFT 4 is closed state, and that the high voltage power supply 21 is connected to a node N1 through the TFT 4 and an inverter 12 and the low voltage power supply 22 is connected to a node N2 through an inverter 11 (That is, assuming that an output signal So1 has the high power supply voltage Vs_high as the high output voltage Vo_high, and that an output signal So2 has the low power supply voltage Vs_low as the low output voltage Vo_low).

Under such condition, the voltage converting device 100 changes the TFTs 2 and 3 from opened state to closed state and changes the TFT 4 from closed state to opened state at the instant t2 in order to carry out the voltage converting operation. Since the TFT4 is changed from closed state to opened state, the high voltage power supply 21 is disconnected from the inverter 12, so that the node N1 is disconnected from the high voltage power supply 21. Further, since the TFT2 is changed from opened state to a closed state, the node N1 is supplied with the low input voltage Vi_low (=Vgnd) of the input signal Si1. Since the low input voltage Vi_low (=Vgnd) is inputted into the inverter 11 through the node N1, the inverter 11 connects its terminal 11c for the high voltage power supply 21 to its output terminal 11b, but it is noted that the TFT4 is changed from a closed state to a opened state at the instant t2. Since the TFT4 is changed to opened state, the high voltage power supply 21 is disconnected from the inverter 11 although the inverter 11 connects its terminal 11c for the high voltage power supply 21 to its output terminal 11b. Therefore, the high voltage power supply 21 becomes a state in which it is disconnected from the node N2. Further, since the TFT 3 is changed from opened state to closed state at the instant t2, the node N2 is supplied with the high input voltage Vi_high of the input signal Si2 through the TFT3. Therefore, a voltage on the node N2 becomes the high input voltage Vi_high of the input signal Si2. Since the voltage on the node N2 becomes the high input voltage Vi_high of the input signal Si2, the high input voltage Vi_high is inputted into the inverter 12, so that the node N1 is connected to the low voltage power supply 22 through the inverter 12. Therefore, a voltage on the node N1 is kept the low power supply voltage Vs_low (=Vgnd) during a period from the instant t2 to the instant t3. Further, since the voltage on the node N1 is kept the low power supply voltage Vs_low (=Vgnd) during the period from the instant t2 to the instant t3, the inverter 11 connects its terminal 11c for the high voltage power supply 21 to its output terminal 11b. However, since the TFT 4 is opened state, the high voltage power supply 21 is being disconnected from the inverter 11. Therefore, the voltage on the node N2 is kept the high input voltage Vi_high of the input signal Si2 during the period from the instant t2 to the instant t3.

In this way, during the period from the instant t2 to t3, the voltage on the node N1 is kept the low power supply voltage Vs_low (=Vgnd), whereas the voltage on the node N2 is kept the high input voltage Vi_high of the input signal Si2. Therefore, the output portion Out1 outputs the low power supply voltage Vs_low (=Vgnd) of the low voltage power supply 22 as the output signal So1, the output portion Out2 outputs the high input voltage Vi_high as the output signal So2. At the instant t3, the low input voltage Vi_low of the input signal Si1 has been already converted into the low power supply voltage Vs_low (=Vgnd), but the high input voltage Vi_high of the input signal Si2 is not yet converted into the high power supply voltage Vs_high. In order to convert the high input voltage Vi_high of the input signal Si2 into the high power supply voltage Vs_high, the TFTs 2 and 3 are changed from the closed state to opened state and the TFT 4 is changed from the opened state to the closed state at the instant t3. As a result of this, the high voltage power supply 21 can be connected to the node N2 through the inverter 11, so that the high power supply voltage Vs_high is outputted from the output portion Out2. In this way, the low input voltage Vi_low of the input signal Si1 is converted into the low power supply voltage Vs_low (=Vgnd), and the high input voltage Vi_high of the input signal Si2 is converted into the high power supply voltage Vs_high.

In the case of the voltage converting device 100 shown in FIG. 1, the TFT 2 is changed from opened state to closed state at the instant t2, so that the voltage on the node N1 (the voltage outputted from the output portion Out1) is changed from the high output voltage Vo_high to the low output voltage Vo_low. Therefore, at the instant when the TFT 2 is changed from opened state to closed state at the instant t2, the high output voltage Vo_high on the node N1 is supplied to the input portion In1 through the closed TFT 2, so that an unwanted high voltage Vue is superimposed on the input signal Si1. If such high voltage Vue is superimposed on the input signal Si1, a high voltage is applied to a signal source 50 supplying the voltage converting device 100 with the input signals Si1 and Si2, so that there may be fear of reducing lifetime of the signal source 50.

DISCLOSURE OF THE INVENTION

Problem to be Solved by the Invention

An object of the present invention is to provide a device which can prevent an unwanted high voltage from being supplied to an input portion of the device.

Means for Solving the Problem

A device according to the present invention for achieving the object described above comprises a first input portion for receiving a first input signal, a first output portion for outputting a first output signal, and a first voltage dropping means for dropping a voltage on a first node before changing from a state in which the first input portion is disconnected from the first node to a state in which the first input portion is connected to the first node, with the first node being located between the first input portion and the first output portion.

By dropping a voltage on a first node before connecting the first input portion to the first node, supply of unwanted voltage from the first node to the first input portion can be prevented.

A voltage converting device according to the present invention receives a first input signal having a first high input voltage and a first low input voltage, the first high input voltage having a relatively high voltage level and the first low input voltage having a relatively low voltage level, wherein the voltage converting device converts at least one of the first high input voltage and the first low input voltage and outputs the first input signal having a converted voltage level as a first output signal, wherein the voltage converting device comprises a first input portion for receiving the first input signal, a first output portion for outputting the first output signal, and a voltage converting means for converting at least one of the first high input voltage and the first low input voltage, and wherein the voltage converting means comprises a first voltage dropping means for dropping a voltage on a first node before changing from a state in which the first input portion is disconnected from the first node to a state in which the first input portion is connected to the first node, the first node located between the first input portion and the first output portion.

By dropping a voltage on a first node before connecting the first input portion to the first node, supply of unwanted voltage from the first node to the first input portion can be prevented when the voltage converting device performs voltage converting operation.

In the voltage converting device according to the present invention, the voltage converting means may comprise first conversion voltage supplying part for supplying the first node with a first conversion voltage for converting one of the first high input voltage and the first low input voltage, the first conversion voltage having a higher voltage level than the first high input voltage, and wherein the first voltage dropping means may drop a voltage on the first node, before changing from a state in which the first input portion is disconnected from the first node and the first conversion voltage supplying part is connected to the first node to a state in which the first input portion is connected to the first node.

In the case that the voltage converting device comprises the first conversion voltage supplying part for supplying a first conversion voltage having a higher voltage level than the first high input voltage for the purpose of voltage conversion, and that the first conversion voltage supplying part is connected to the first node, the voltage on the first node become higher than the first high input voltage. Therefore, in the case that a signal source for the first input signal dose not ensure a sufficient tolerance for the higher voltage than the first high input voltage, the signal source for the first input signal needs to be protected from the first conversion voltage. In this case, by dropping a voltage on a first node before connecting the first input portion to the first node, the signal source can be protected from the first conversion voltage which is higher than the first high input voltage.

In the voltage converting device according to the present invention, the voltage converting means may comprise second conversion voltage supplying part for supplying the first node with a second conversion voltage for converting the other of the first high input voltage and the first low input voltage, the second conversion voltage having a voltage level lower than or equal to the first high input voltage, and wherein the first voltage dropping means may connect the second conversion voltage supplying part instead of the first conversion voltage supplying part to the first node, before changing from a state in which the first input portion is disconnected from the first node and the first conversion voltage supplying part is connected to the first node to a state in which the first input portion is connected to the first node.

If the second conversion voltage supplied by the second conversion voltage supplying part is lower than or equal to the first high input voltage, the voltage on the first node can be lower than or equal to the first high input voltage by connecting the first node to the second conversion voltage supplying part. Therefore, even if the signal source for the first input signal dose not ensure a sufficient tolerance for the higher voltage than the first high input voltage, the signal source can be protected from the first conversion voltage higher than the first high input voltage by connecting the first node to the second conversion voltage supplying part.

In the voltage converting device according to the present invention, the first voltage dropping means may comprise a first switching means for making a first connection state in which the second conversion voltage supplying part is connected to the first node and a first disconnection state in which the second conversion voltage supplying part is disconnected from the first node, and a first driving circuit for driving the first switching means.

By controlling the first switching means by the first driving circuit, the second conversion voltage supplying part can be connected to the first node before the first input portion is connected to the first node. Therefore, the voltage on the first node can become smaller than or equal to the first high input voltage before the first input portion is connected to the first node, so that the signal source can be protected from the first conversion voltage which is higher than the first high input voltage.

In the voltage converting device according to the present invention, the voltage converting device may receive a second input signal having a second high input voltage and a second low input voltage, the second high input voltage having a relatively high voltage level and the second low input voltage having a relatively low voltage level, wherein the voltage converting device may convert at least one of the second high input voltage and the second low input voltage and outputs the second input signal having a converted voltage level as a second output signal.

If the voltage converting device converts not only the first input signal but also the second input signal, supply of unwanted voltage from the first node to the first input portion can be still prevented by dropping a voltage on a first node before connecting the first input portion to the first node.

In the voltage converting device according to the present invention, the voltage converting device may comprise second input portion for receiving the second input signal and second output portion for outputting the output signal, and wherein the voltage converting means may comprise a second voltage dropping means for dropping a voltage on a second node before changing from a state in which the second input portion is disconnected from a second node to a state in which the second input portion is connected to the second node, the second node located between the second input portion and the second output portion.

With such constitution, not only supply of unwanted voltage from the first node to the first input portion but also supply of unwanted voltage from the second node to the second input portion can be prevented.

In the voltage converting device according to the present invention, the voltage converting means may comprise third conversion voltage supplying part for supplying the second node with a third conversion voltage for converting one of the second high input voltage and the second low input voltage, the third conversion voltage having a higher voltage level than the second high input voltage, and wherein the second voltage dropping means may drop a voltage on the second node, before changing from a state in which the second input portion is disconnected from the second node and the third conversion voltage supplying part is connected to the second node to a state in which the second input portion is connected to the second node.

With such constitution, even if the signal source for the second input signal dose not ensure a sufficient tolerance for the higher voltage than the second high input voltage, the signal source can be protected from the third conversion voltage which is higher than the second high input voltage.

In the voltage converting device according to the present invention, it is preferable that the voltage converting means comprises fourth conversion voltage supplying part for supplying the second node with a fourth conversion voltage for converting the other of the second high input voltage and the second low input voltage, the fourth conversion voltage having a voltage level tower than or equal to the second high input voltage, and that the second voltage dropping means connects the fourth conversion voltage supplying part instead of the third conversion voltage supplying part to the second node, before changing from a state in which the second input portion is disconnected from the second node and the third conversion voltage supplying part is connected to the second node to a state in which the second input portion is connected to the second node.

Even if the signal source for the second input signal dose not ensure a sufficient tolerance for the higher voltage than the second high input voltage, the signal source can be protected from the third conversion voltage higher than the second high input voltage by connecting the second node to the fourth conversion voltage supplying part.

In the voltage converting device according to the present invention, it is preferable that the second voltage dropping means comprises a second switching means for making a second connection state in which the third conversion voltage supplying part is connected to the second node and a second disconnection state in which the third conversion voltage supplying part is disconnected from the second node, and a second driving circuit for driving the second switching means.

By controlling the second switching means by the second driving circuit, the fourth conversion voltage supplying part can be connected to the second node before the second input portion is connected to the second node, so that the signal source can be protected from the third conversion voltage.

It is preferable that the first driving circuit plays a role on the second driving circuit.

With such constitution, there is no need to individually provide the first and second driving circuits, so that the voltage converting device has smaller size.

BEST MODE FOR CARRYING OUT THE INVENTION

Figure 3:
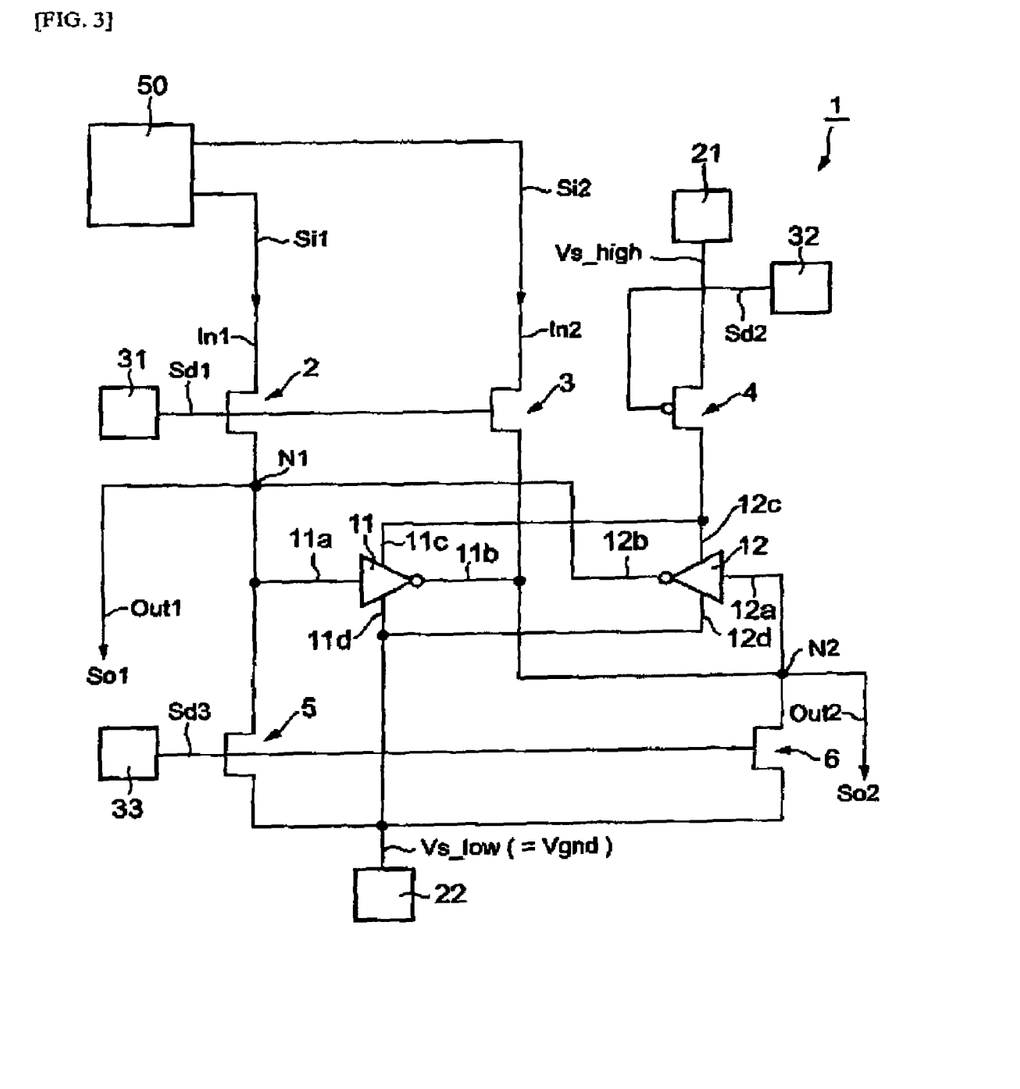
FIG. 3 is schematic diagram showing a voltage converting device 1 of an embodiment according to the present invention.
Figure 4:
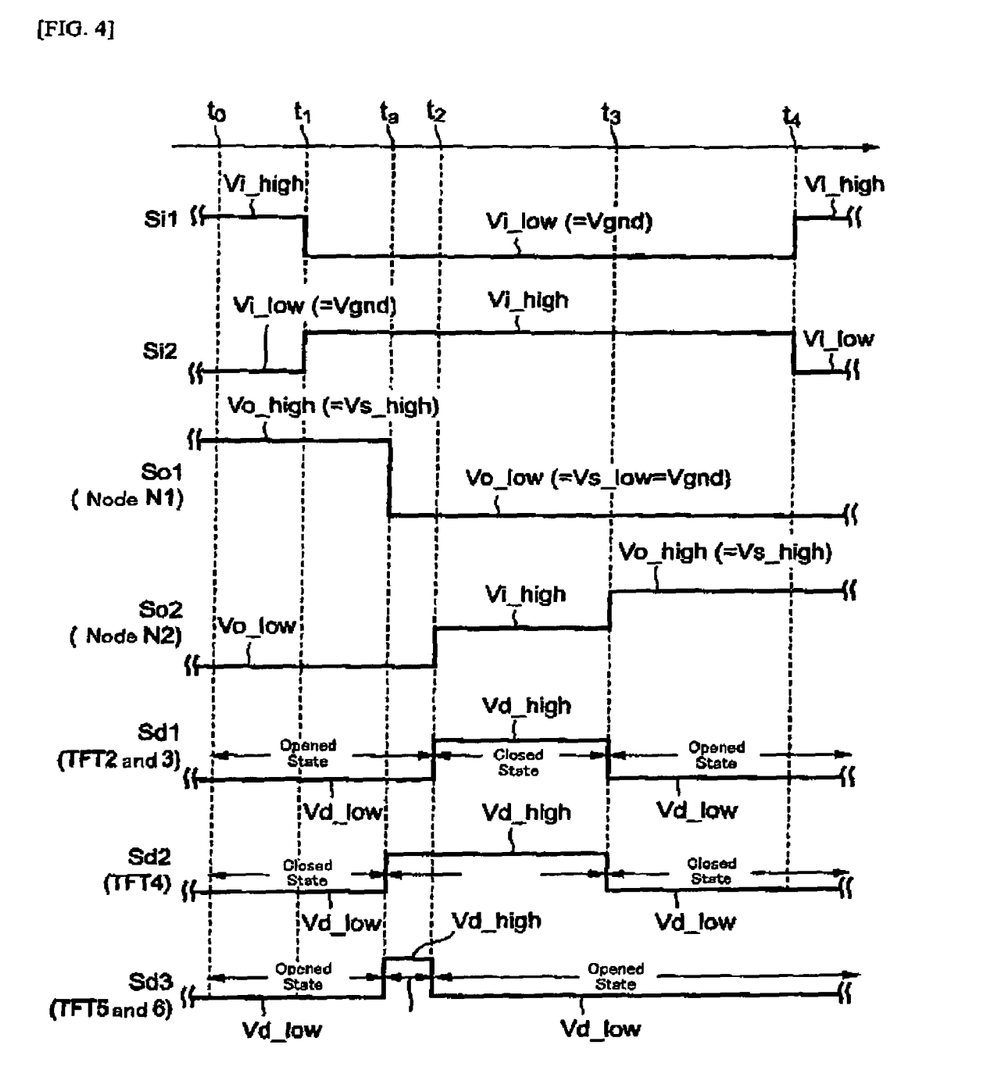
FIG. 4 is a timing chart about the voltage converting device shown in FIG. 3.

FIG. 3 is schematic diagram showing a voltage converting device 1 of an embodiment according to the present invention. FIG. 4 is a timing chart about the voltage converting device shown in FIG. 3.

The voltage converting device 1 receives input signals Si1 and Si2 (see FIG. 2) from a signal source 50, and each of the input signals Si1 and Si2 has alternately repeated low input voltage Vi_low and high input voltage Vi_high. This voltage converting device 1 comprises a high voltage power supply 21 and a low voltage power supply 22 in order to convert voltage levels of the input signals Si1 and Si2, the high voltage power supply 21 generates a high power supply voltage Vs_high which is larger than the high input voltage Vi_high, and the low voltage power supply 22 generates a low power supply voltage Vs_low which is the same level as the low input voltage Vi_low. In the embodiment, the low power supply voltage Vs_low is the same voltage level as the low input voltage Vi_low, but it is noted that the low power supply voltage Vs_low may have different voltage level than the low input voltage Vi_low. Further, in the embodiment, the low power supply voltage Vs_low and the low input voltage Vi_low are voltage of ground level (hereinafter, referred to as "ground voltage") Vgnd, but it is also noted that the low power supply voltage Vs_low and the low input voltage Vi_low are not limited to the voltage level of the ground voltage Vgnd. The voltage converting device 1 comprising such high voltage power supply 21 and low voltage power supply 22 converts the low input voltage Vi_low of the input signal Si1 or Si2 into the low output voltage Vo_low by connecting the low voltage power supply 22 to the node N1 or N2 and converts the high input voltage Vi_high of the input signal Si1 or Si2 into the high output voltage Vo_high by connecting the high voltage power supply 21 to the node N1 or N2.

The voltage converting device 1 performing the voltage conversion described above comprises two input portions In1 and In2 for receiving the input signals Si1 and Si2. When the input portion In1 receives the high input voltage Vi_high of the input signal Si1, the input portion In2 receives the low input voltage Vi_low of the input signal Si2. When the input portion In1 receives the low input voltage Vi_low of the input signal Si1, the input portion In2 receives the high input voltage Vi_high of the input signal Si2. Therefore, there is an inverted relationship between the voltage levels of the input signals Si1 and Si2.

The input portions In1 and In2 are connected to the n type TFTs 2 and 3, respectively. The TFTs 2 and 3 become closed state (on-state, i.e. conductive state) when a voltage level of a driving signal Sd1 outputted from a driving circuit 31 is a high driving voltage Vd_high, and become opened state (off-state, i.e. non-conductive state) when the voltage level of the driving signal Sd1 is a low driving voltage Vd_low. The TFT 2 is connected to an inverter 11 through the node N1. The inverter 11 comprises not only the input terminal 11a and the output terminal 11b but also a terminal 11c for the high voltage power supply 21 and a terminal 11*d* for the low voltage power supply 22. The terminal 11*d* is directly connected to the low voltage power supply 22 and the terminal 11*c* is connected to the high voltage power supply 21 through the p type TFT 4. The TFT 3 is connected to the inverter 12 through the node N2. The inverter 12 comprises not only the input terminal 12*a* and the output terminal 12*b* but also a terminal 12*c* for the high voltage power supply 21 and a terminal 12*d* for the low voltage power supply 22. The terminal 12*d* is directly connected to the low voltage power supply 22 and the terminal 12*c* is connected to the high voltage power supply 21 through the TFT 4. The inverter 11 connects the output terminal 11*b* to the terminal 11*c* when the input terminal 11*a* receives the ground voltage Vgnd and connects the output terminal 11*b* to the terminal 11*d* when the input terminal 11*a* receives a voltage greater than or equal to the high input voltage Vi_high. The inverter 12 operates similarly to the inverter 11. Since the TFT 4 between the high voltage power supply 21 and the inverters 11, 12 is p type, the TFT 4 is opened state (off state, i.e. non-conductive state) when the voltage level of the driving signal Sd2 outputted from the driving circuit 32 is the high driving voltage Vd_high, and is closed state (on state, i.e. conductive state) when the voltage level of the driving signal Sd2 outputted from the driving circuit 32 is the low driving voltage Vd_low.

The output terminal 11*b* of the inverter 11 is connected to the input terminal 12*a* of the inverter 12 through the node N2 and the output terminal 12*b* of the inverter 12 is connected to the input terminal 11*a* of the inverter 11 through the node N1.

The voltage converting device 1 comprises TFTs 5 and 6, the TFT 5 is used for switching back and forth between a state in which the low voltage power supply 22 is connected to the node N1 and a state in which the low voltage power supply 22 is not connected to the node N1, and the TFT 6 is used for switching back and forth between a state in which the low voltage power supply 22 is connected to the node N2 and a state in which the low voltage power supply 22 is not connected to the node N2. The TFTs 5 and 6 become closed state (on state, i.e. conductive state) when a voltage level of a driving signal Sd3 outputted from a driving circuit 33 is a high driving voltage Vd_high, and become opened state (off state, i.e. non-conductive state) when the voltage level of the driving signal Sd3 is a low driving voltage Vd_low. The TFTs 5 and 6 are switched to closed state or opened state, depending on the voltage level of the driving signal Sd3 outputted from the driving circuit 33. The node N1 is connected to an output portion Out1 and the node N2 is connected to an output portion Out2.

Next, it is described below how the voltage converting device 1 described above converts the voltage levels of the input signals Si1 and Si2 inputted into the input portions In1 and In2.

During the period from an instant t0 to an instant t1 (see FIG. 4), the driving circuit 31 outputs the low driving voltage Vd_low and thus the TFTs 2 and 3 are opened state, so that the input portions In1 and In2 are disconnected from the nodes N1 and N2, respectively. Therefore, the input signals Si1 and Si2 are not supplied to the nodes N1 and N2, respectively, so that the input signals Si1 and Si2 have no effect on the voltages on the nodes N1 and N2, respectively. Further, during the period from the instant t0 to the instant t1, the driving circuit 32 outputs the low driving voltage Vd_low, so that the TFT4 is closed state. Therefore, during the period from the instant t0 to the instant t1, the high voltage power supply 21 is connected to the inverters 11 and 12.

Under such situation, assuming that the voltage level of the output signal So1 at the instant t0 is the high output voltage Vo_high (that is, the node N1 is connected to the high voltage power supply 21), and that the voltage level of the output signal So2 at the instant to is the low output voltage Vo_low (that is, the node N2 is connected to the low voltage power supply 22). In this case, the inverter 11 receives the high power supply voltage Vs_high, so that the inverter 11 outputs the low power supply voltage Vs_low coming from the low voltage power supply 22. Therefore, the inverter 12 receives the low power supply voltage Vs_low coming from the low voltage power supply 22 through the node N2. Since the inverter 12 having received the low power supply voltage Vs_low outputs the high power supply voltage Vs_high coming from the high voltage power supply 21, the voltage on the node N1 is kept the high power supply voltage Vs_high. Therefore, during the period from the instant t0 to instant t1, the inverter 11 continues to output the low power supply voltage Vs_low, and the inverter 12 continues to output the high power supply voltage Vs_high. As a result of this, during the period from the instant t0 to the instant t1, the output portion Out1 outputs the high power supply voltage Vs_high as the high output voltage Vo_high, and the output portion Out2 outputs the low power supply voltage Vs_low as the low output voltage Vo_low.

At the instant t1, the input signal Si1 changes from the high input voltage Vi_high to the low input voltage Vi_low, and the input signal Si2 changes from the low input voltage Vi_low to the high input voltage Vi_high. Though the input voltages changes in this way, the closed state or opened state of each of the TFTs 2 to 6 during the period from the instant t0 to the instant t1 is continuously kept during a period from the instant t1 to an instant ta. As a result of this, the output portions Out1 and Out2 continue to output the high output voltage Vo_high and the low output voltage Vo_low, respectively, during the period from the instant t1 to the instant ta as well as during the period from the instant t0 to the instant t1.

Next, the voltage converting device 1 converts the low input voltage Vi_low of the input signal Si1 into the low output voltage Vo_low and converts the high input voltage Vi_high of the input signal Si1 into the high output voltage Vo_high. In order to perform such converting operation, it is necessary to supply the low input voltage Vi_low of the input signal Si1 to the node N1 and to supply the high input voltage Vi_high of the input signal Si2 to the node N2. For this purpose, at the instant t2, the voltage converting device 1 changes the TFTs 2 and 3 from opened state to closed state to supply the node N1 with the low input voltage Vi_low of the input signal Si1 and to supply the node N2 with the high input voltage Vi_high of the input signal Si2. However, if the TFT 2 changed from opened state to closed state with the high output voltage Vo_high outputted from the output portion Out1, the high output voltage Vo_high on the node N1 would be superimposed on the input signal Si1 through the TFT2 at the instant when the TFT2 becomes closed state, so that the high output voltage Vo_high would be supplied to the signal source 50. Since the high output voltage Vo_high is higher than the high input voltage Vi_high outputted to the voltage converting device 1 by the signal source 50, the supply of the high output voltage Vo_high to the signal source 50 would add an unwanted voltage to the signal source 50, which might shorten the life of the signal source 50.

In the embodiment, in order not to add the high voltage to the signal source 50 when the TFTs 2 and 3 change from opened state to closed state, the voltage on the node N1 is dropped before the TFTs 2 and 3 change from opened state to closed state. It is explained below how the voltage on the node N1 is dropped before the TFTs 2 and 3 change from opened state to closed state.

In order to drop the voltage on the node N1 before the TFTs 2 and 3 change from opened state to closed state, the voltage converting device 1 changes the TFT 4 from closed state to opened state and changes the TFTs 5 and 6 from opened state to closed state. In order to change the TFTs 4 to 6 as described above, the driving signals Sd2 and Sd3 from the driving circuits 32 and 33 change from the low driving voltage Vd_low to the high driving voltage Vd_high at the instant ta (ta is between t1 and t2) preceding the instant t2 at which the driving signal Sd1 of the driving circuit 31 changes from the low driving voltage Vd_low to the high driving voltage Vd_high. The TFT 4 changes from closed state to opened state by changing the driving signal Sd2 of the driving circuit 32 from the low driving voltage Vd_low to the high driving voltage Vd_high, so that the high voltage power supply 21 is disconnected from the node N1. On the other hand, the TFT 5 changes from opened state to closed state by changing the driving signal Sd3 of the driving circuit 33 from the low driving voltage Vd_low to the high driving voltage Vd_high, so that the low voltage power supply 22 is connected to the node N1 through the TFT5. Therefore, by changing the driving signals Sd2 and Sd3 from the low driving voltage Vd_low to the high driving voltage Vd_high at the instant ta, the voltage on the node N1 is dropped from the high power supply voltage Vs_high to the low power supply voltage Vs_low.

In this way, the voltage on the node N1 can be dropped from the high power supply voltage Vs_high to the low power supply voltage Vs_low before the TFT2 changes from opened state to closed state. Since the voltage on the node N1 is dropped to the low power supply voltage Vs_low, the output portion Out1 outputs the low power supply voltage Vs_low as the low output voltage Vo_low. Therefore, the output signal So1 outputted from the output portion Out1 changes from the high output voltage Vo_high to the low output voltage Vo_low at the instant ta.

Since the node N1 is connected to the low voltage power supply 22, the inverter 11 receives the low power supply voltage Vs_low, so that the inverter 11 connects its terminal 11c for the high voltage power supply 21 to its output terminal 11b. However, the inverter 11 is disconnected from the high voltage power supply 21 since the TFT 4 is opened state, so that the node N2 is disconnected from the high voltage power supply 21. Since the voltage level of the driving signal Sd3 of the driving circuit 33 changes from the low driving voltage Vd_low to the high driving voltage Vd_high, the TFT 6 changes from opened state to closed state, so that the node N2 is connected to the low voltage power supply 22 through the TFT 6. Therefore, the voltage level of the output signal So2 remains the low power supply voltage Vs_low.

In this way, the voltage on the node N1 is dropped into the low power supply voltage Vs_low before the TFTs 2 and 3 change from opened state to closed state, after that, the TFTs 2 and 3 change from opened state to closed state at the instant t2. The TFTs 2 and 3 are kept closed state during the period from the instant t2 to the instant t3 and change from closed state to opened state at the instant t3. It is noted that the TFT4 is kept opened state during the period from the instant t2 to the instant t3 and changes from opened state to closed state at the instant t3, whereas the TFTs 5 and 6 change from closed state to opened state at the instant t2. By controlling the TFTs 2 to 6 as described above, the low input voltage Vi_low of the input signal Si1 can be converted into the low output voltage Vo_low of the output signal So1, and the high input voltage Vi_high of the input signal Si2 can be converted into the high output voltage Vo_high of the output signal So1. This conversion operation is described below.

Since the TFT2 changes from opened state to closed state at the instant t2, the input portion In1 is connected to the node N1, so that the node N1 is supplied with the low input voltage Vi_low (=Vgnd) of the input signal Si1 from the input portion In1. It is noted that, like the low power supply voltage Vs_low, the low input voltage Vi_low is the ground voltage Vgnd. Since both the low input voltage Vi_low and the low power supply voltage Vs_low are the ground voltage Vgnd, the voltage on the node N1 remains the low power supply voltage Vs_low (=Vgnd) although the node N1 is supplied with the low input voltage Vi_low of the input signal Si1. Therefore, the low power supply voltage Vs_low is inputted into the inverter 11 although the TFT2 changes from opened state to closed state, so that the inverter 11 connects the terminal 11c for the high voltage power supply 21 to the output terminal 11b. However, since the TFT4 is opened state at the instant t2, the inverter 11 is disconnected from the high voltage power supply 21, so that the node N2 becomes a state in which the node N2 is disconnected from the high voltage power supply 21. Further, since the TFT6 changes from closed state to opened state at the instant t2, the low voltage power supply 22 is disconnected from the node N2. Further, at the instant t2, the input portion In2 is connected to the node N2 since the TFT3 changes from opened state to closed state, so that the high input voltage Vi_high of the input signal So2 is supplied from the input portion In2 to the node N2. Therefore, the output portion Out2 outputs the high input voltage Vi_high as the voltage of the output signal So2.

The high input voltage Vi_high on the node N2 is outputted from the output portion Out2 on the one hand, the high input voltage Vi_high on the node N2 is supplied to the inverter 12 on the other hand. Therefore, the inverter 12 outputs the low power supply voltage Vs_low (=Vgnd) of the low voltage power supply 22 into the node N1, so that the node N1 is connected to the low voltage power supply 22. Further, during the period from the instant t2 to the instant t3, the voltage of the input signal Si1 supplied to the node N1 through the TFT2 is the low input voltage Vi_low (i.e. the ground voltage Vgnd). Therefore, during the period from the instant t2 to the instant t3, the voltage on the node N1 is kept the low power supply voltage Vi_low (=Vgnd). The inverter 11 connects the terminal 11c for the high voltage power supply 21 to the output terminal 11b since the voltage of the node N1 is kept the low power supply voltage Vi_low (=Vgnd), but the node N2 is not connected to the high voltage power supply 21 since the TFT4 is in the opened state, so that the voltage on the node N2 is kept Vi_high during the period from the instant t2 to the instant t3.

During the instant t2 to the instant t3, the voltage on the node N1 is kept the low power supply voltage Vs_low and the voltage on the node N2 is kept the high input voltage Vi_high as described above, so that the output portion Out1 outputs the low power supply voltage Vs_low (=Vgnd) as the low output voltage Vo_low of the output signal So1, and the output portion Out2 outputs the high input voltage Vi_high as the voltage of the output signal So2. Therefore, at the instant t3, the low input voltage Vi_low of the input signal Si1 has been already converted into the low output voltage Vo_low (=the low power supply voltage Vs_low), but the high input voltage Vi_high of the input signal Si2 is not converted into the high output voltage Vo_high (=the high power supply voltage Vs_high) yet. In order to convert the high input voltage Vi_high of the input signal Si2 into the high output voltage Vo_high (=the high power supply voltage Vs_high), the TFTs 2 and 3 are changed from closed state to opened state and the TFT4 is changed from opened state to closed state at the instant t3 with the TFTs 5 and 6 kept opened state.

At the instant t3, the voltage on the node N1 is the low output voltage Vo_low (=low power supply voltage Vs_low), so that the inverter 11 connects the terminal 11c for the high voltage power supply 21 to the output terminal 11b. It is noted that the TFT4 is changed from opened state to closed state at the instant t3. Since the TFT4 is changed to closed state, the high voltage power supply 21 is connected to the terminal 11c through the TFT4. Further, since the TFT6 is opened state at the instant t3, the low voltage power supply 22 is not connected to the node N2. Furthermore, since the TFT3 is changed from closed state to opened state at the instant t3, the input portion In2 is disconnected from the node N2, so that the input signal Si2 is not supplied to the node N2. As a result of this, the voltage on the node N2 becomes the high power supply voltage Vs_high of the high voltage power supply 21. Since the high power supply voltage Vs_high on the node N2 is supplied to the inverter 12, the node N1 is connected to the low voltage power supply 22 through the inverter 12. Therefore, the voltage on the node N1 is kept the low power supply voltage Vs_low. Since the voltage on the node N1 is kept the low power supply voltage Vs_low, the high voltage power supply 21 continues to be connected to the node N2 by the inverter 11, so that the voltage on the node N2 is kept the high power supply voltage Vs_high of the high voltage power supply 21.

In this way, the voltage on the node N1 is kept the low power supply voltage Vs_low (=Vgnd) and the voltage on the node N2 is kept the high power supply voltage Vs_high, so that the output portion Out1 outputs the low power supply voltage Vs_low (=Vgnd) as the low output voltage Vo_low and the output portion Out2 outputs the high power supply voltage Vs_high as the high output voltage Vo_high. Therefore, the low input voltage Vi_low of the input signal Si1 can be converted into the low output voltage Vo_low, and the high input voltage Vi_high of the input signal Si2 can be converted into the high output voltage Vo_high.

Next, the voltage converting device 1 converts the high input voltage Vi_high of the input signal Si1 into the high output voltage Vo_high and converts the low input voltage Vi_low of the input signal Si2 into the low output voltage Vo_low. For the converting operation, at the instant t4, the voltage level of the input signal Si1 changes from the low input voltage Vi_low to the high input voltage Vi_high, and the voltage level of the input signal Si2 changes from the high input voltage Vi_high to the low input voltage Vi_low. After the instant t4, the TFTs 2 to 6 perform the same operation of switching to opened state or closed state as the TFTs 2 to 6 perform during the period from the instant t1 to t4. Such same operation of switching of the TFTs 2 to 6 will prevent the signal source 50 from being supplied with the unwanted high voltage from the node N2 through the TFT3.

As described above, the voltage converting device 1 can convert the voltage levels of the input signals In1 and In2 while preventing the signal source 50 from being supplied with the unwanted high voltage. In this embodiment, the voltage converting device 1 is constructed as shown in FIG. 3 in order to connect or disconnect the power supplies 21 and 22 to or from the nodes N1 and N2 according to the timing chart shown in FIG. 4. It is however noted that the voltage converting device 1 may have the other constitution than the constitution shown in FIG. 3. For example, the TFT4 is p-type in this embodiment, but may be n-type. In this case, in order to perform the closing and opening of the TFT4 of n-type according to the timing chart shown in FIG. 4, the driving circuit 32 may output different driving signal from the driving signal Sd2 shown in FIG. 4, the different driving signal having the inverted voltage levels with respect to the driving signal Sd2. By outputting such different driving signal, the closing and opening of the TFT4 can be performed according to the timing chart shown in FIG. 4 even if the TFT 4 is n-type. Ditto for the other TFTs. Further, the TFTs 2 and 3 are driven by the common driving circuit 31, but may be driven by different driving circuits. Similarly, the TFTs 5 and 6 may be driven by different driving circuits. However, if the single driving circuit 31 drives two TFTs 2 and 3 and the single driving circuit 33 drives two TFTs 5 and 6, it is not necessary to provide individual driving circuit for each TFT, so that downsizing of the voltage supplying device 1 is achieved.

The voltage converting device 1 of this embodiment lowers the voltage on the node N1 from the high output voltage Vo_high (=high power supply voltage Vs_high) to the low output voltage Vo_low (=low power supply voltage Vs_low) by connecting the node N1 to the low voltage power supply 22 at the instant ta preceding the instant t2 at which the TFTs 2 and 3 are changed from opened state to closed state, Therefore, the unwanted high voltage can be prevented from being applied to the signal source 50 if the TFTs 2 and 3 are changed from opened state to the closed state, so that the reliability of the signal source 50 can be improved.

In this embodiment, in order to drop the voltage on the node N1 before changing the TFT2 from opened state to closed state, the node N1 is connected to the low voltage power supply 22 through the TFT5. However, it is not necessary to connect the node N1 to the low voltage power supply 22 in so far as the voltage on the node N1 can be dropped. For example, an additional power supply for dropping the voltage on the node N1 may be provided to connect the node N1 to the additional power supply before the TFT2 is changed from opened state to closed state. However, if the additional power supply is provided, an occupying area of the voltage converting device 1 become wider accordingly. Therefore, it is preferable that, without providing the additional power supply, the node N1 is connected to the low voltage power supply 22. Also, an additional power supply may be provided to drop the voltage on the node N2. However, from the similar reason as the case where the voltage on the node N1 is dropped, it is preferable that, without providing the additional power supply, the node N2 is connected to the low voltage power supply 22.

In this embodiment, in order to prevent the signal source 50 from being supplied with the unwanted voltage, the voltage on the node N1 is dropped to the low power supply voltage Vs_low, i.e. the ground voltage Vgnd, before the TFT2 is changed from opened state to closed state. However, since the signal source 50 is constructed so as to output the high input voltage Vi_high, it is not necessary to drop the voltage on the node N1 down to the ground Vgnd in consideration of the viewpoint of preventing the signal source 50 from being supplied with unwanted voltage. In other words, if the voltage on the node N1 is dropped to a voltage lower than or equal to the high input voltage Vi_high, the signal source 50 can be prevented from being supplied with the unwanted voltage. Therefore, instead of connecting the node N2 to the low voltage power supply 22, the voltage converting device 1 may be structured in such a way that an additional power supply for generating the voltage lower than or equal to the high input voltage Vi_high is provided and the additional power supply is connected to the node N1. However, if the additional power supply is provided, an occupying area of the voltage converting device 1 become wider accordingly. Therefore, it is preferable that, without providing the additional power supply, the node N1 is connected to the low voltage power supply 22. From the similar reason, it is preferable that, without providing the additional power supply, the node N2 is connected to the low voltage power supply 22.

In the embodiment described above, the example of applying the present invention to the voltage converting device is described. It is however noted that the present invention may be applied to the other devices than the voltage converting device, which are required to prevent the unwanted high voltage from being supplied to an input portion side via switching means such as TFT.

INDUSTRIAL APPLICABILITY

The present invention can be used, for example, in the device required to convert voltage levels (such as liquid crystal display).

The invention claimed is:

1. A voltage converting device for receiving a first input signal having a first high input voltage and a first low input voltage and a second input signal having a second high input voltage and a second low input voltage, said first high input voltage having a relatively high voltage level and said first low input voltage having a relatively low voltage level, and said second high input voltage having a relatively high voltage level and said second low input voltage having a relatively low voltage level, wherein said voltage converting device converts at least one of said first high input voltage and said first low input voltage and outputs said first input signal having a converted voltage level as a first output signal and converts at least one of said second high input voltage and said second low input voltage and outputs said second input signal having a converted voltage level as a second output signal, wherein said voltage converting device comprises:
a first input portion receiving said first input signal;
a first output portion outputting said first output signal;
a second input portion receiving said second input signal;
a second output portion outputting said second output signal; and
a voltage converting circuit converting at least one of said first high input voltage and said first low input voltage and at least one of said second high input voltage and said second low input voltage,
and wherein said voltage converting circuit comprises a first voltage dropping circuit dropping a voltage on a first node located between said first input portion and said first output portion to ground voltage before changing from a state in which said first input portion is disconnected from said first node to a state in which said first input portion is connected to said first node; and a second voltage dropping circuit dropping a voltage on a second node located between said second input portion and said second output portion to ground voltage before changing from a state in which said second input portion is disconnected from said second node to a state in which said second input portion is connected to said second node.

2. A voltage converting device as claimed in claim 1, wherein said voltage converting circuit comprises first conversion voltage supplying part supplying said first node with a first conversion voltage to convert one of said first high input voltage and said first low input voltage, said first conversion voltage having a higher voltage level than said first high input voltage,
and wherein said first voltage dropping circuit drops a voltage on said first node, before changing from a state in which said first input portion is disconnected from said first node and said first conversion voltage supplying part is connected to said first node to a state in which said first input portion is connected to said first node.

3. A voltage converting device as claimed in claim 2, wherein said voltage converting circuit comprises second conversion voltage supplying part supplying said first node with a second conversion voltage to convert the other of said first high input voltage and said first low input voltage, said second conversion voltage having a voltage level lower than or equal to said first high input voltage,
and wherein said first voltage dropping circuit connects said second conversion voltage supplying part instead of said first conversion voltage supplying part to said first node, before changing from a state in which said first input portion is disconnected from said first node and said first conversion voltage supplying part is connected to said first node to a state in which said first input portion is connected to said first node.

4. A voltage converting device as claimed in claim 3, wherein said voltage converting circuit comprises third conversion voltage supplying part supplying said second node with a third conversion voltage to convert .one of said second high input voltage and said second low input voltage, said third conversion voltage having a higher voltage level than said second high input voltage,
and wherein said second voltage dropping circuit drops a voltage on said second node, before changing from a state in which said second input portion is disconnected from said second node and said third conversion voltage supplying part is connected to said second node to a state in which said second input portion is connected to said second node.

5. A voltage converting device as claimed in claim 4 wherein said voltage converting circuit comprises fourth conversion voltage supplying part supplying said second node with a fourth conversion voltage to convert the other of said second high input voltage and said second low input voltage, said fourth conversion voltage having a voltage level lower than or equal to said second high input voltage,
and wherein said second voltage dropping circuit connects said fourth conversion voltage supplying part instead of said third conversion voltage supplying part to said second node, before changing from a state in which said second input portion is disconnected from said second node and said third conversion voltage supplying part is connected to said second node to a state in which said second input portion is connected to said second node.

6. A voltage converting device as claimed in claim 5, wherein said first voltage dropping circuit comprises:
a first switching circuit making a first connection state in which said second conversion voltage supplying part is connected to said first node and a first disconnection state in which said second conversion voltage supplying part is disconnected from said first node; and
a first driving circuit driving said first switching circuit.

7. A voltage converting device as claimed in claim 6, wherein said second voltage dropping circuit comprises:

a second switching circuit making a second connection state in which said third conversion voltage supplying part is connected to said second node and a second disconnection state in which said third conversion voltage supplying part is disconnected from said second node; and a second driving circuit driving said second switching circuit.

8. A voltage converting device as claimed in claim 7, wherein said first driving circuit further plays a role as said second driving circuit.

9. A voltage converting device as claimed in claim 8, wherein said second conversion voltage comprises the same voltage level as said first low input voltage.

10. A voltage converting device as claimed in claim 9, wherein said fourth conversion voltage comprises the same voltage level as said second low input voltage.

11. A voltage converting device as claimed in claim 10, wherein said first conversion voltage supplying part plays a role as said third conversion voltage supplying part, and wherein said second conversion voltage supplying part plays a role as said fourth conversion voltage supplying part.

12. A voltage converting device as claimed in claim 11, wherein said first conversion voltage is equal to the said third conversion voltage, and wherein said second conversion voltage is equal to the said fourth conversion voltage.

13. A voltage converting device comprising:
a first input portion receiving a first input signal, wherein said first input signal having a first high input voltage and a first low input voltage, said first high input voltage having a relatively high voltage level and said first low input voltage having a relatively low voltage level;
a first output portion outputting a first output signal;
a second input portion receiving a second input signal, wherein said second input signal having a second high input voltage and a second low input voltage, said second high input voltage having a relatively high voltage level and said second low input voltage having a relatively low voltage level;
a second output portion outputting a second output signal; and
a voltage dropping circuit dropping voltages on a first node located between said first input portion and said first output portion to ground voltage and on a second node located between said second input portion and said second output portion to ground voltage, before changing from a state in which said first input portion is disconnected from said first node to a state in which said first input portion is connected to said first node.

14. A voltage converting device as claimed in claim 13, wherein said voltage converting circuit comprises first conversion voltage supplying part supplying said first node with a first conversion voltage to convert one of said first high input voltage and said first low input voltage, said first conversion voltage having a higher voltage level than said first high input voltage, and wherein said voltage dropping circuit drops the voltage on said first and second nodes, before changing from a state in which said first input portion is disconnected from said first node and said first conversion voltage supplying part is connected to said first node to a state in which said first input portion is connected to said first node.

15. A voltage converting device as claimed in claim 14, wherein said voltage converting circuit comprises second conversion voltage supplying part supplying said first node with a second conversion voltage converting the other of said first high input voltage and said first low input voltage, said second conversion voltage having a voltage level lower than or equal to said first high input voltage, and wherein said voltage dropping circuit connects said second conversion voltage supplying part to said first and second nodes, before changing from a state in which said first input portion is disconnected from said first node and said first conversion voltage supplying part is connected to said first node to a state in which said first input portion is connected to said first node.

16. A voltage converting device as claimed in claim 15, wherein said voltage dropping circuit comprises:
a first switching circuit making a first connection state in which said second conversion voltage supplying part is connected to said first node and a first disconnection state in which said second conversion voltage supplying part is disconnected from said first node;
a second switching circuit making a second connection state in which said second conversion voltage supplying part is connected to said second node and a second disconnection state in which said second conversion voltage supplying part is disconnected from said second node; and a first driving circuit driving said first switching circuit.

17. A voltage converting device as claimed in claim 16, wherein said second conversion voltage has the same voltage level as said first low input voltage.

* * * * *